United States Patent
Park et al.

(10) Patent No.: US 12,351,269 B2
(45) Date of Patent: Jul. 8, 2025

(54) BICYCLE PEDAL WITH ELASTOMERIC SURFACE

(71) Applicant: Nine Point Eight Inc., Ancaster (CA)

(72) Inventors: Steven Andrew Park, Paris (CA); Jacobus Josef Pittens, Waterdown (CA)

(73) Assignee: Nine Point Eight Inc., Ancaster (CA)

( * ) Notice: Subject to any disclaimer, the term of this patent is extended or adjusted under 35 U.S.C. 154(b) by 0 days.

(21) Appl. No.: 18/203,247

(22) Filed: May 30, 2023

(65) Prior Publication Data

US 2023/0382488 A1 Nov. 30, 2023

Related U.S. Application Data

(60) Provisional application No. 63/346,871, filed on May 29, 2022.

(51) Int. Cl.
*B62M 3/08* (2006.01)
*A43B 5/14* (2006.01)

(52) U.S. Cl.
CPC ............... *B62M 3/08* (2013.01); *A43B 5/14* (2013.01); *B62M 3/086* (2013.01)

(58) Field of Classification Search
CPC ........... B62M 3/08; B62M 3/086; A43B 5/14; A43B 5/145; A43C 15/16
See application file for complete search history.

(56) References Cited

U.S. PATENT DOCUMENTS

| | | | | |
|---|---|---|---|---|
| 527,384 A | * | 10/1894 | Davids | B62M 3/08 |
| | | | | 384/545 |
| 581,095 A | * | 4/1897 | Willard | B62M 3/08 |
| | | | | 74/594.4 |
| 1,977,415 A | * | 10/1934 | Thorp | G05G 1/483 |
| | | | | 482/79 |

(Continued)

FOREIGN PATENT DOCUMENTS

| CN | 209904978 U | * | 1/2020 | B32B 25/02 |
|---|---|---|---|---|
| DE | 4138941 A1 | * | 6/1993 | A43C 15/16 |

(Continued)

OTHER PUBLICATIONS

UnParallel Sports Order Form; Date of May 15, 2023; https://www.unparallelsports.com/wp-content/uploads/2023/05/Unparallel_Resole_order_form-23-update.pdf.*

(Continued)

*Primary Examiner* — Adam D Rogers
(74) *Attorney, Agent, or Firm* — CRGO Global; Steven M. Greenberg

(57) ABSTRACT

In one aspect, a bicycle pedal comprises a main pedal body adapted to rotatably receive an axle and defining at least one pedal platform base upon which is disposed a layer of a low-rebound elastomeric material to form a pedal platform surface. In another aspect, a bicycle pedal has a main pedal body adapted to rotatably receive an axle and defining at least one pedal platform base upon which is disposed a layer of elastomeric material to form a pedal platform surface. For each pedal platform base, the main pedal body defines a delamination shield that extends beyond the respective pedal platform base to shield a vanguard inferior edge of the respective layer of elastomeric material.

11 Claims, 14 Drawing Sheets

(56) References Cited

U.S. PATENT DOCUMENTS

| | | | | |
|---|---|---|---|---|
| 2,568,443 | A * | 9/1951 | Gerner | B62M 3/08 |
| | | | | 74/563 |
| 3,952,428 | A * | 4/1976 | Polsky | A43B 5/14 |
| | | | | 36/131 |
| 4,662,090 | A * | 5/1987 | Solano | A43B 5/14 |
| | | | | 36/131 |
| 4,836,047 | A | 6/1989 | Alcamo | |
| 5,027,675 | A | 7/1991 | McCune et al. | |
| 5,211,076 | A | 5/1993 | Baume et al. | |
| 6,725,742 | B2 * | 4/2004 | Bremer | A43B 13/26 |
| | | | | 36/131 |
| 7,552,550 | B2 * | 6/2009 | Maffeis | A43C 15/161 |
| | | | | 36/134 |
| 9,596,906 | B2 * | 3/2017 | Lee | A43B 13/145 |
| 9,795,184 | B2 | 10/2017 | Ueda et al. | |
| 10,653,206 | B2 * | 5/2020 | Chaney | A43B 13/122 |
| 11,718,366 | B2 * | 8/2023 | Favero | G01L 5/225 |
| | | | | 74/594.4 |
| 2013/0312290 | A1 * | 11/2013 | Donald | B62M 3/086 |
| | | | | 36/131 |
| 2015/0053045 | A1 * | 2/2015 | Barjesteh | B62M 3/08 |
| | | | | 74/594.4 |
| 2017/0015385 | A1 * | 1/2017 | Lin | B62M 3/08 |
| 2023/0339570 | A1 * | 10/2023 | Simmons | A43B 5/14 |

FOREIGN PATENT DOCUMENTS

| | | | | |
|---|---|---|---|---|
| DE | 4203777 A1 | * | 7/1993 | B62M 3/08 |
| DE | 202016107518 U1 | * | 3/2017 | |
| EP | 2366615 A1 | * | 9/2011 | B62M 3/08 |
| EP | 3689729 A1 | * | 8/2020 | B32B 25/02 |
| FR | 1036229 A | * | 9/1953 | |
| FR | 1046242 A | * | 12/1953 | |
| GB | 531809 A | * | 1/1941 | |
| GB | 649361 A | * | 1/1951 | |
| GB | 727816 A | * | 4/1955 | |
| GB | 827144 A | * | 2/1960 | |
| GB | 2409960 A | * | 7/2005 | A43C 15/063 |
| WO | WO-2021177485 A1 | * | 9/2021 | |

OTHER PUBLICATIONS

Mountain Project; https://www.mountainproject.com/forum/topic/118333321/where-to-find-data-on-c4-rubber-physical-properties (Year: 2020).*

UnParallel Rubber Physical Properties by UnParallel Rubber; https://www.unparallelsports.com/wp-content/uploads/unpallarell-rubber-physical-properties.pdf.*

* cited by examiner

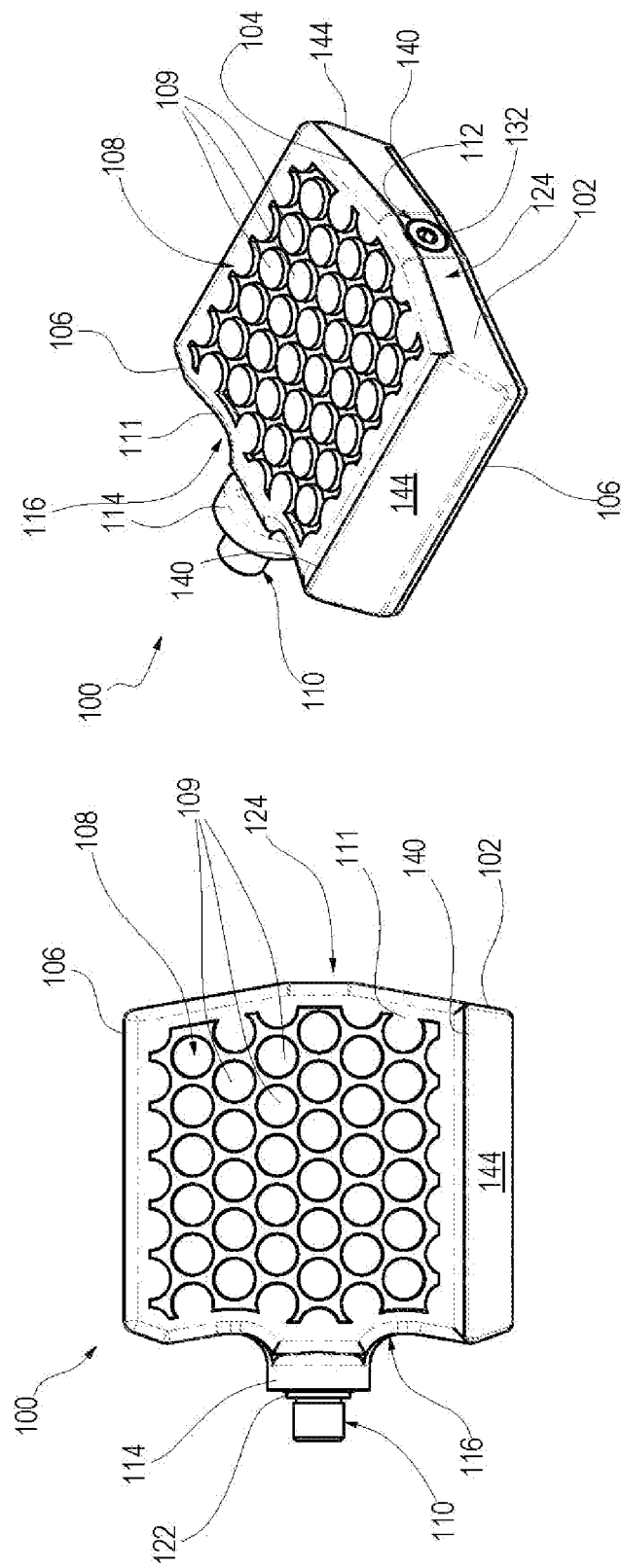

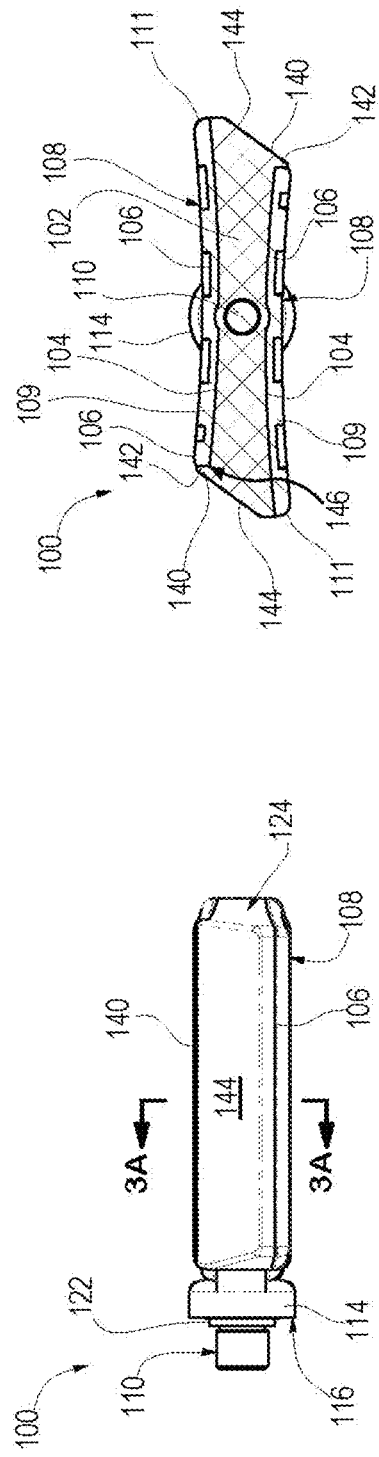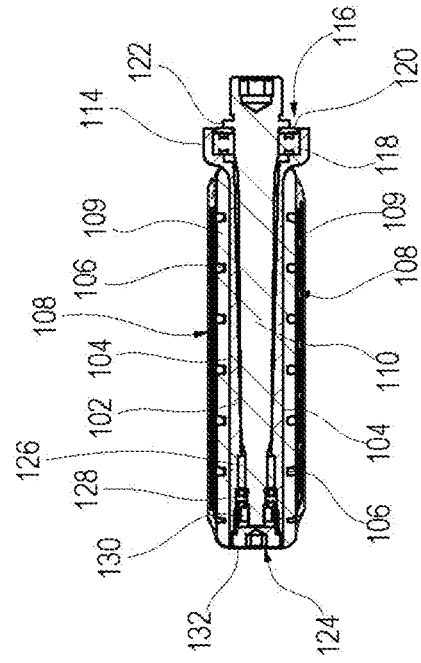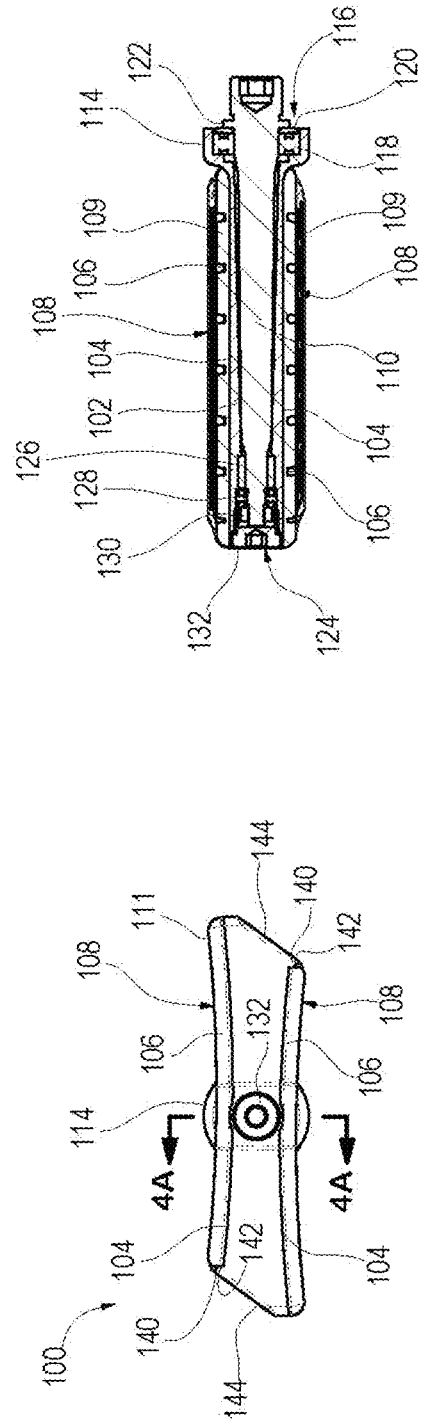

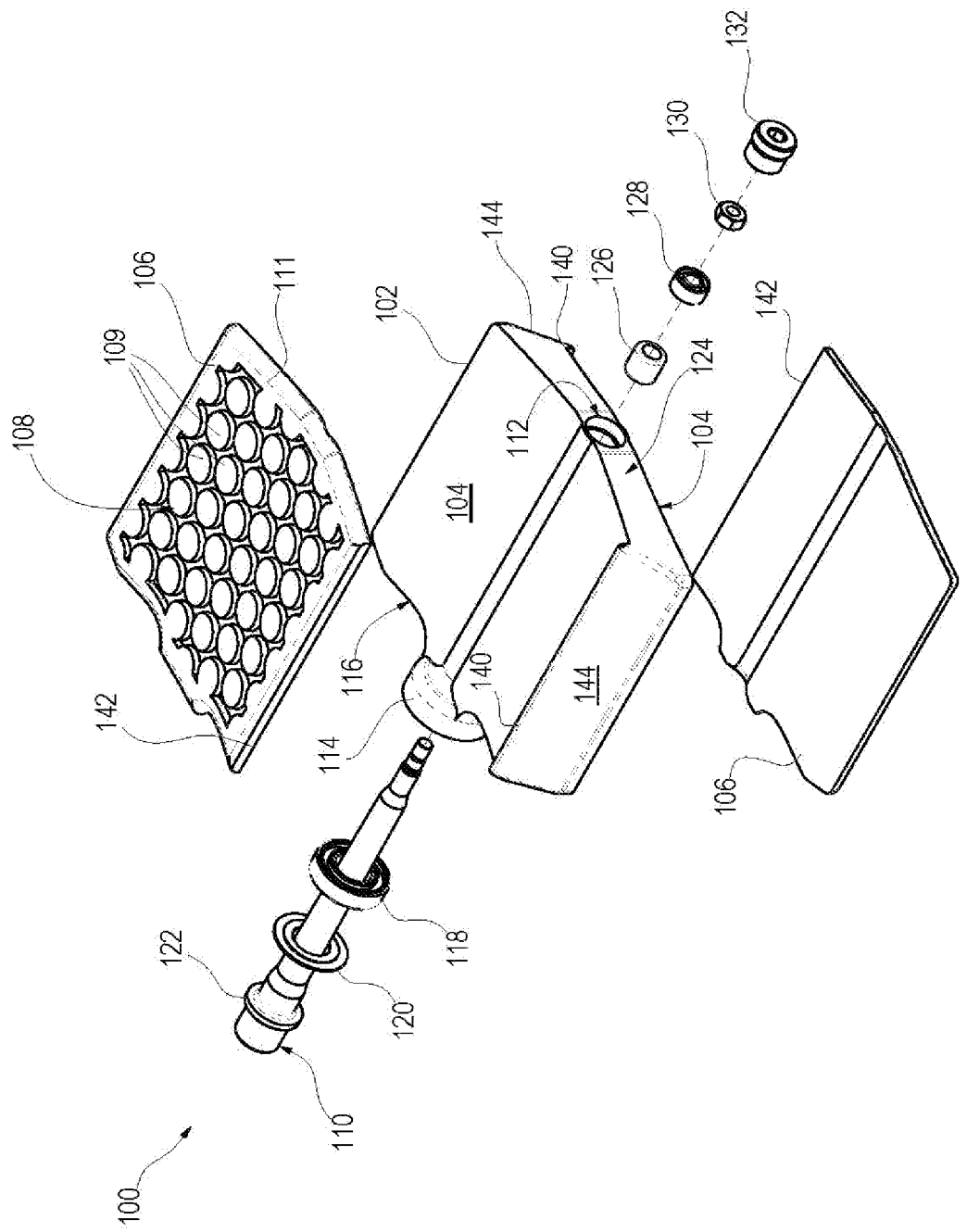

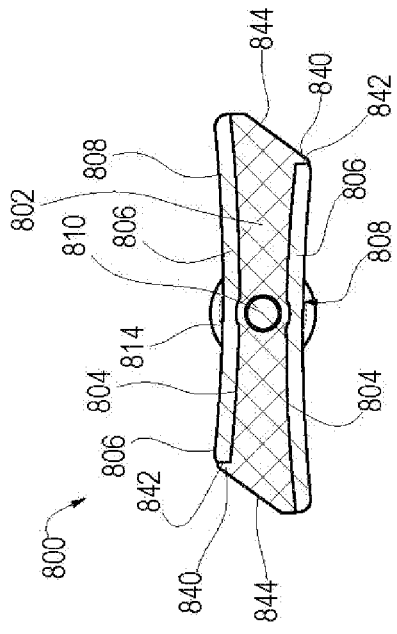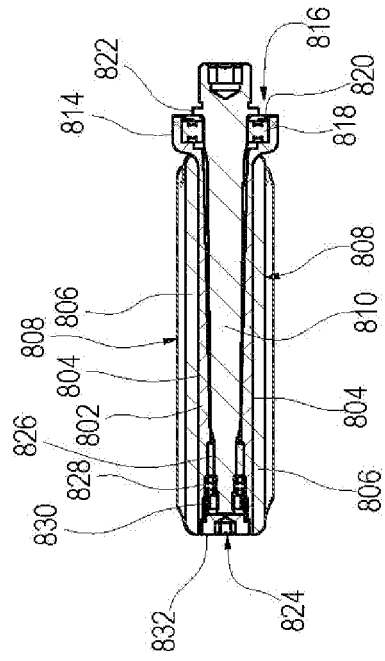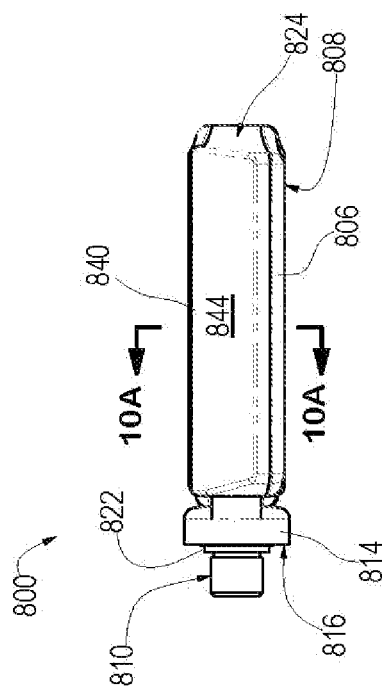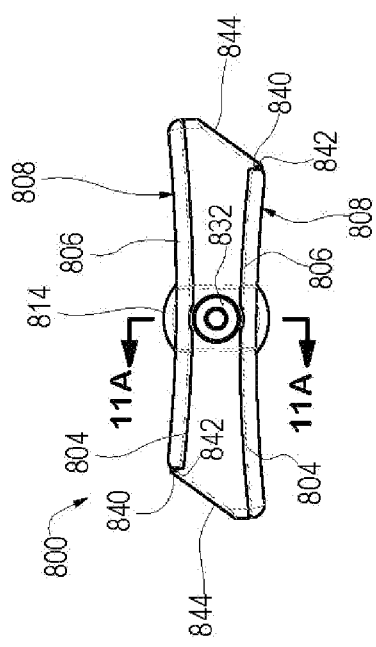

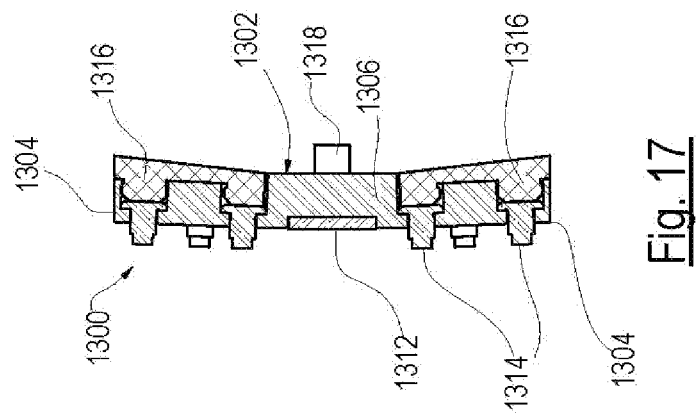
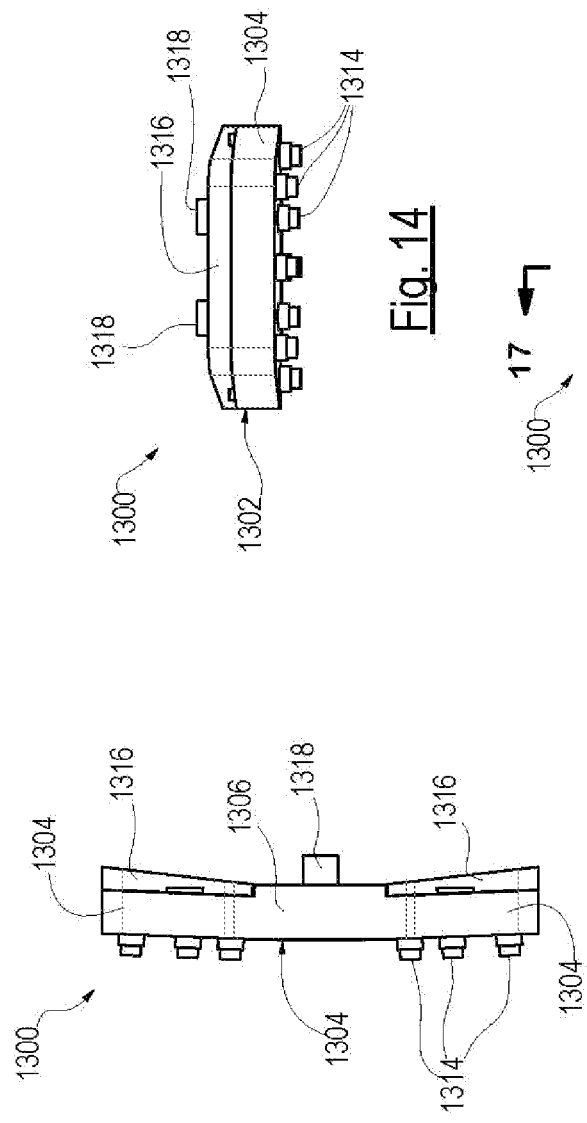
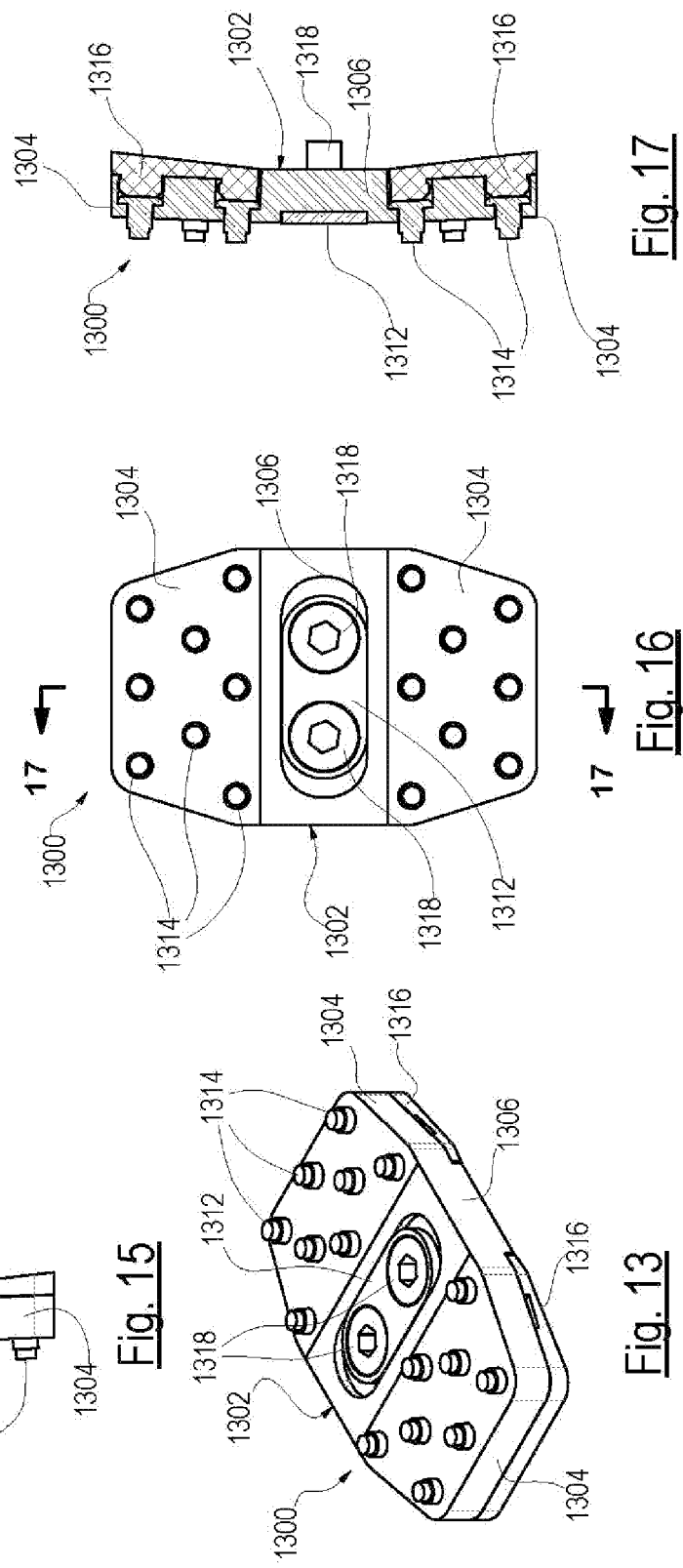

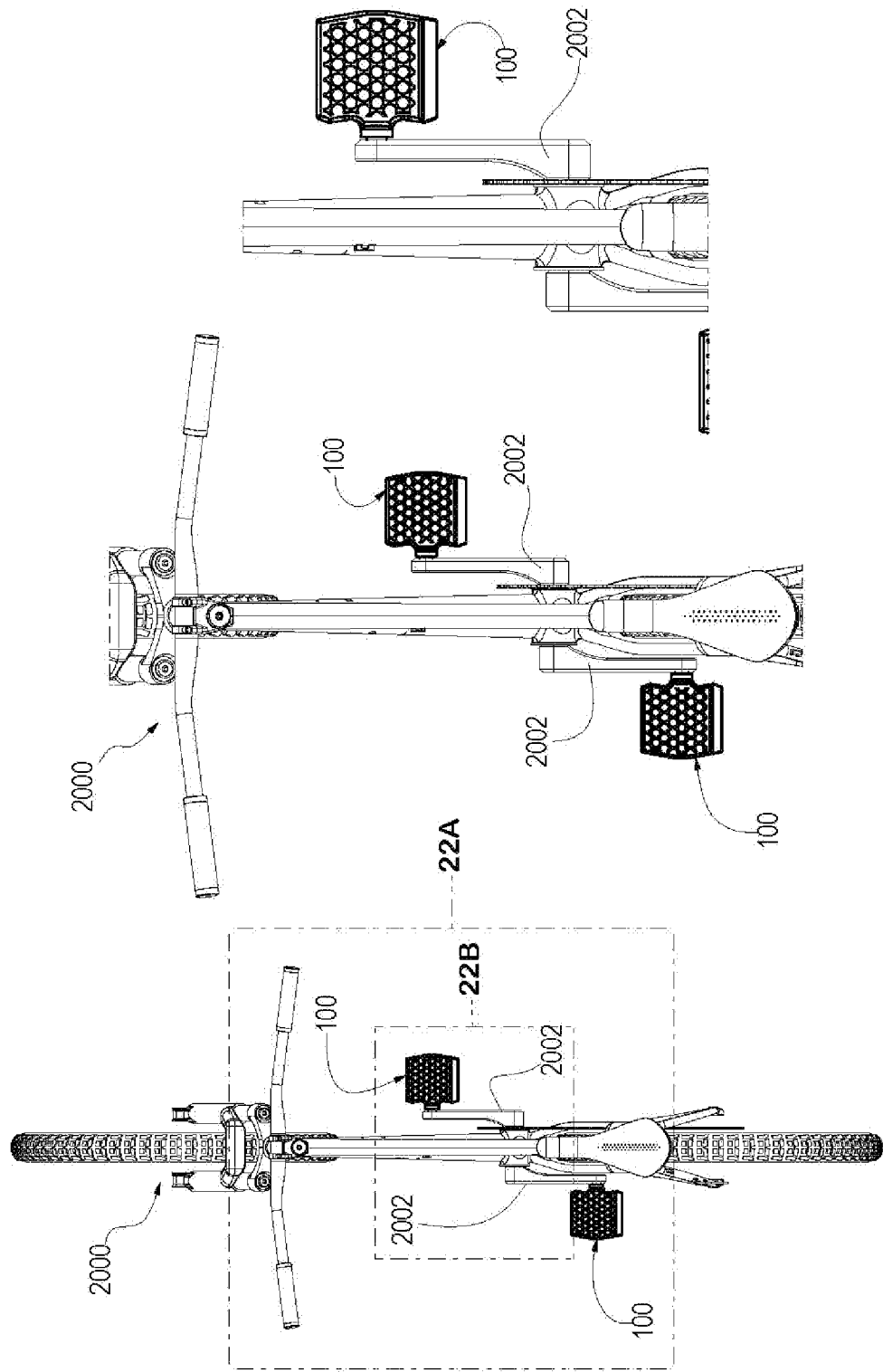

BICYCLE PEDAL WITH ELASTOMERIC SURFACE

CROSS-REFERENCE TO RELATED APPLICATION

The present application claims priority to U.S. Provisional Application No. 63/346,871 filed on May 29, 2022, the entire teachings of which are hereby incorporated by reference.

TECHNICAL FIELD

The present disclosure relates to bicycles, and more particularly to bicycle pedals.

BACKGROUND

In bicycling, the interface between a rider's feet and the pedals of the bicycle is of significant importance, as this is how the rider's muscular force is transmitted to the bicycle to achieve locomotion. Thus, there have been numerous attempts to improve this interface.

U.S. Pat. No. 4,836,047 to Alcamo describes a cycling arrangement in which a shoe clip which attaches to a bicyclist's shoe has a pair of serrated lateral tongues which couple with and are inserted into complementary serrated recesses in the associated bicycle pedal. Along the same lines, U.S. Pat. No. 5,211,076 to Baume et al. describes a cycle pedal and an associated shoe, where the shoe has a sole contour matched to a complementary contour formed in the cycle pedal, and U.S. Pat. No. 5,027,675 to McCune et al. similarly describes a cycling shoe provided with a cleat section having a stepped surface that is complementary with a stepped surface of the pedal. U.S. Pat. No. 9,795,184 to Ueda et al. describes a shoe positioning plate attached to the sole of a shoe, which mates with a step-in bicycle pedal without fixing the shoe positioning plate to the step-in pedal.

SUMMARY

In one aspect, a bicycle pedal comprises a main pedal body adapted to rotatably receive an axle, with the main pedal body defining at least one pedal platform base upon which is disposed a layer of a low-rebound elastomeric material to form a pedal platform surface.

In one embodiment, the main pedal body defines two opposed pedal platform bases; and the low-rebound elastomeric material forms two opposed pedal platform surfaces. In a particular such embodiment, for each pedal platform base, the main pedal body defines a delamination shield that extends beyond the respective pedal platform base to shield a vanguard inferior edge of the respective layer of low-rebound elastomeric material.

In some embodiments, each pedal platform surface is concave along a travel axis of the pedal.

In some embodiments, each pedal platform surface comprises a plurality of spaced-apart protrusions. In particular embodiments, the protrusions may have sloped sides to form valley-shaped gaps between adjacent ones of the protrusions, which valley-shaped gaps may be U-shaped, V-shaped, or half-round, or sides of the protrusions may be generally orthogonal to a floor of the layer of the low-rebound elastomeric material.

In some embodiments, each pedal platform surface is substantially smooth and free of protrusions.

A system may comprise two pedals as described above, and two pieces of footwear, each piece of footwear having an outer sole and having a plurality of studs projecting from the sole. Tips of the studs may have a hardness of at least 40 Rockwell B, more preferably a hardness of at least 40 Rockwell C.

A mountain biking kit may comprise at least one pedal as described above, and at least one of: at least one studded-sole footwear; at least one footwear-mountable studded sole plate; and a plurality of threaded sole studs. In particular embodiments, the mountain biking kit comprises two pedals as described above, and at least one of: a pair of studded-sole footwear; a pair of footwear-mountable studded sole plates; and a plurality of threaded sole studs.

In another aspect, a bicycle pedal comprises a main pedal body adapted to rotatably receive an axle, with the main pedal body defining at least one pedal platform base upon which is disposed a layer of an elastomeric material to form a pedal platform surface, wherein for each pedal platform base, the main pedal body defines a delamination shield that extends beyond the respective pedal platform base to shield a vanguard inferior edge of the respective layer of elastomeric material.

In some embodiments, each pedal platform surface is concave along a travel axis of the pedal.

In some embodiments, each pedal platform surface comprises a plurality of spaced-apart protrusions. The protrusions may have sloped sides to form valley-shaped gaps between adjacent ones of the protrusions, or sides of the protrusions may be generally orthogonal to a floor of the layer of the elastomeric material.

BRIEF DESCRIPTION OF THE DRAWINGS

These and other features will become more apparent from the following description in which reference is made to the appended drawings wherein:

FIG. 1 is a plan view of a first illustrative pedal according to an aspect of the present disclosure;

FIG. 2 is an isometric view of the pedal of FIG. 1;

FIG. 3 is an end elevation view of the pedal of FIG. 1;

FIG. 3A is a cross-sectional view of the pedal of FIG. 1 taken along the line 3A-3A in FIG. 3;

FIG. 4 is a side elevation view of the pedal of FIG. 1;

FIG. 4A is a cross-sectional view of the pedal of FIG. 1 taken along the line 4A-4A in FIG. 4;

FIG. 5 is an exploded isometric view of the pedal of FIG. 1;

FIG. 10 is an end elevation view of the pedal of FIG. 8;

FIG. 10A is a cross-sectional view of the pedal of FIG. 8 taken along the line 10A-10A in FIG. 10;

FIG. 11 is a side elevation view of the pedal of FIG. 8;

FIG. 11A is a cross-sectional view of the pedal of FIG. 8 taken along the line 11A-11A in FIG. 11;

FIG. 13 is an isometric view of an illustrative footwear-mountable studded sole plate according to an aspect of the present disclosure;

FIG. 14 is an end elevation view of the footwear-mountable studded sole plate of FIG. 13;

FIG. 15 is a side elevation view of the footwear-mountable studded sole plate of FIG. 13;

FIG. 16 is a plan view of the footwear-mountable studded sole plate of FIG. 13;

FIG. 17 is a cross-sectional view of the footwear-mountable studded sole plate of FIG. 13, taken along the line 17-17 in FIG. 16;

FIG. 22 is a top plan view of an illustrative bicycle having two of the pedals of FIG. 1;

FIG. 22A is a first detail view of a portion of FIG. 22;

FIG. 22B is a second detail view of a portion of FIG. 22;

DETAILED DESCRIPTION

Figure 7:
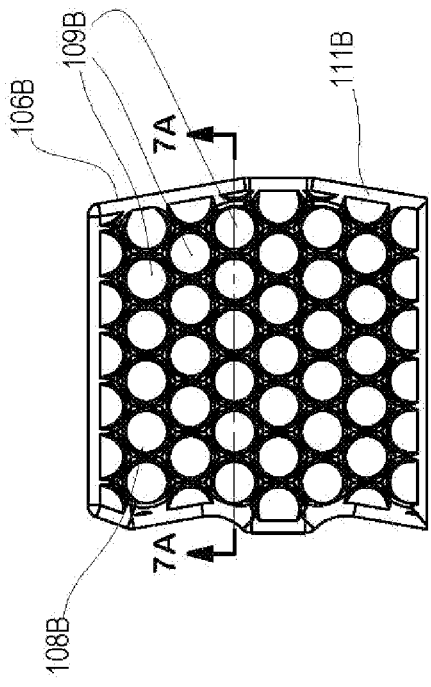
FIG. 7 is a plan view of a second illustrative embodiment of a layer of elastomeric material for forming a pedal platform surface.

Reference is first made to FIGS. 1 to 7, which show a first illustrative non-limiting embodiment of a bicycle pedal, indicated generally by reference 100, according to an aspect of the present disclosure.

The bicycle pedal 100 comprises a main pedal body 102 which defines two opposed concave pedal platform bases 104. The main pedal body 102 is preferably monolithic, although a multi-part structure is also contemplated. The main pedal body 102 may be constructed from any suitable material, but is preferably constructed from reinforced nylon; suitable moldable polymers and metals, such as aluminum and its alloys, may also be used. A respective layer 106 of a low-rebound elastomeric material is disposed on each of the pedal platform bases 104 to form two respective opposed pedal platform surfaces 108. The term "layer", as used in this context, encompasses both a single monolithic layer as well as a multilayer laminate structure. The term "low-rebound elastomeric material" means a material having a resilience of about 25% or less, preferably about 20% or less, more preferably about 15% or less, still more preferably about 13% or less and still even more preferably about 11% or less. The resilience may be measured, for example, using ASTM D7121-05(2018) at a temperature of 23±2 C°. In summary, this test imparts energy into the elastomeric material via an impact, the returned energy is measured, and from this, the percentage of energy returned is calculated. For example, the low-rebound elastomeric material for the layers 106 in the illustrative pedal 100 may be the RH—Hard Compound offered by UnParallel Sports, having an address at 2931 East La Cresta Ave., Anaheim, CA 92806. The RH—Hard Compound has a Shore A hardness of 76-80 and a resilience of 13%, although this is merely a non-limiting illustrative example. In some embodiments, the low-rebound elastomeric material for the layers 106 may have a hardness between 40 Shore A and 90 Shore A; this is merely a non-limiting example. The thickness of the low-rebound elastomeric material for the layers 106, including any protrusions 109 (as described further below) should be sufficient to facilitate practical construction and impart durability against wear. While there is no upper limit on the thickness of the low-rebound elastomeric material for the layers 106, it is generally desirable to keep the pedal 100 as thin as practicable once desired durability and footwear interengagement objectives are achieved. In some embodiments, the layers 106 may, for example, have a thickness between 3.5 mm and 6.5 mm, although this is merely a non-limiting example. The layers 106 may be secured to the main pedal body 102 by suitable adhesive or interlocking features, or a metal or polymer plate of suitable strength could be incorporated into the layers 106 to facilitate securement to the main pedal body 102 by way of suitable threaded fasteners.

As best seen in FIGS. 3A and 4, in the illustrated pedal 100, each pedal platform surface 108 is concave along a travel axis of the pedal 100, that is, an axis parallel to the direction of travel of a bicycle when the pedal 100 is mounted thereto, i.e. from front to back or back to front. Optionally, the pedal platform surface 108 may also be concave perpendicular to the travel axis, i.e. from side to side. In other embodiments each pedal platform surface may be planar, or one may be planar and one concave. Other configurations are also contemplated. Each pedal platform surface 108 comprises a plurality of spaced-apart protrusions 109 surrounded by a raised peripheral wall 111 generally commensurate in height with the protrusions 109. In the illustrated embodiment, the protrusions 109 form a pattern of regularly repeating circles when viewed perpendicularly to the pedal platform surface 108, but may have other shapes and/or patterns as well. Moreover, the protrusions need not be of identical shape, but may be a combination of two or more different shapes.

The main pedal body 102 is adapted to rotatably receive an axle 110. As best seen in the exploded view in FIG. 5, the main pedal body 102 has a bore 112 therethrough with an enlarged collar 114 on a mounting side 116 of the main pedal body 102. The axle 110 is inserted into the bore 112 through the collar 114, and is journalled within a mounting side sealed ball bearing 118 and protected by a shield 120; the mounting side ball bearing 118 and the shield 120 are received in the collar 114 and retained by an annular flange 122 on the axle 110. Toward the outer side 124 of the main pedal body 102 (opposite the mounting side 116), the axle 110 is journalled within a needle roller bearing 126 and an outer side sealed ball bearing 128 both disposed within the bore 112, and secured by a nut 130 and an outer cap 132. The outer cap 132 seals the axle assembly and the nut 130 clamps the outer side sealed ball bearing 126 axially. This arrangement is merely one illustrative structure by which a main pedal body may be adapted to rotatably receive an axle 110, and is not intended to be limiting.

As best seen in FIGS. 3A, 4 and 5, for each pedal platform base 104, the main pedal body 102 defines a delamination shield 140 that extends beyond the respective pedal platform base 104 to shield a vanguard inferior edge 142 of the respective layer 106 of low-rebound elastomeric material. As used in this context, the term "vanguard inferior edge" refers to the edge of the layer 106 of low-rebound elastomeric material that will, when the pedal 100 is mounted on a bicycle, be moving forward relative to the bicycle travel direction ("vanguard") and located on an underside of the pedal 100 opposite the pedal platform surface 108 that receives the rider's foot ("inferior"). Thus, when a bicycle is in use, the vanguard inferior edge 142 of the respective layer 106 of low-rebound elastomeric material will be adjacent to the leading edge of the pedal 100, on the bottom of the pedal 100. In this position, the vanguard inferior edge 142 of the respective layer 106 of low-rebound elastomeric material would, but for the delamination shield 140, be vulnerable to impacts from, rocks, curbs, branches or other objects or sharp-edged trail features which could begin to cause delamination of the layer 106 of low-rebound elastomeric material from the pedal platform base 104. The delamination shield 140 deflects such impacts to protect the junction 146 (see FIG. 3A) between the vanguard inferior edge 142 of the layer 106 of low-rebound elastomeric material and the pedal platform base 104 and inhibit such delamination. While an additional delamination shield may optionally be provided on the vanguard superior edge (i.e. the edge of the layer 106 of low-rebound elastomeric material forming the pedal platform surface 108 that receives the rider's foot and that moves forward relative to the bicycle travel direction), it is believed that in most cases the rider's foot will provide sufficient protection.

In the illustrated embodiment, there are two opposed pedal platform surfaces 108 and two delamination shields 140 arranged so as to be diametrically opposed to one another. In the illustrated embodiment, the edges 144 of the main pedal body are sloped or chamfered relative to the bicycle travel direction and the delamination shields 140 are formed by extensions of these edges 144 that continue beyond the respective pedal platform bases 104. Thus, regardless of which pedal platform surface 108 receives the rider's foot, the other pedal platform surface 108 will have the vanguard inferior edge 142 of the respective layer 106 of low-rebound elastomeric material disposed behind its respective delamination shield 140, relative to the travel direction of the bicycle.

The specific configuration of the delamination shields 140 shown in the Figures is merely illustrative, and is not intended to be limiting. For example, and without limitation, the edges of the main pedal body which form the delamination shields may be blunt/flat, generally convex, or generally concave, among other shapes. Moreover, it is also contemplated that the delamination shields may be separate pieces secured to the main pedal body.

Of note, while particularly advantageous in this context, the use of delamination shields of the type generally described herein is not limited to pedals in which the pedal platform surface(s) 108 are formed by low-rebound elastomeric material. Delamination shields of the type generally described herein may be used in any type of bicycle pedal having a main pedal body defining at least one pedal platform base upon which is disposed at least one layer of an elastomeric material. Thus, an embodiment similar to that shown in FIGS. 1 to 5 wherein the pedal platform surfaces are formed by an elastomeric material that is not a low-rebound elastomeric material is explicitly contemplated. In such an embodiment, the use of delamination shields may be particularly advantageous where the elastomeric material has a hardness rating of Shore A 90 or softer.

Although the illustrative pedal 100 shown in FIGS. 1 to 5 has two opposed pedal platform bases 104 and two opposed pedal platform surfaces 108, either of which can receive a rider's foot, the present disclosure is not so limited. In other embodiments, a pedal may have only a single pedal platform base and a single pedal platform surface.

Figure 6:
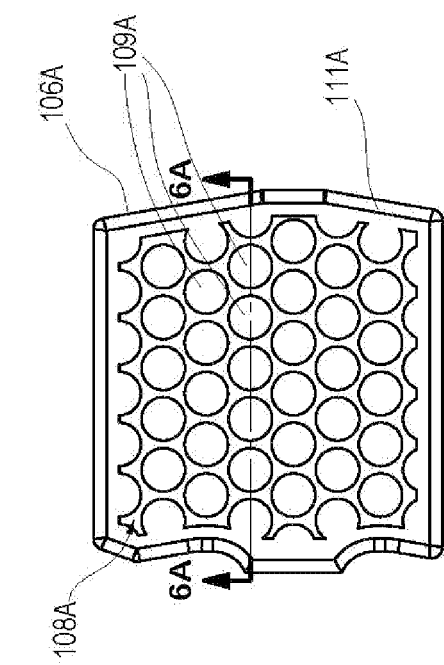
FIG. 6 is a plan view of a first illustrative embodiment of a layer of elastomeric material for forming a pedal platform surface.

As noted above, in the illustrative embodiment shown in FIGS. 1 to 5, each pedal platform surface 108 comprises a plurality of spaced-apart protrusions 109. Reference is now made to FIGS. 6 to 7B to describe certain particular but non-limiting illustrative embodiments of the spaced apart protrusions 109.

Figure 6A:
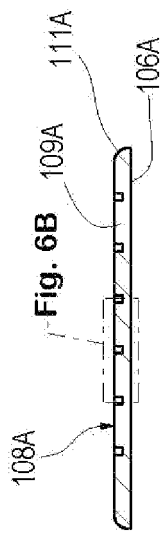
FIG. 6A is a cross-sectional view of the layer of elastomeric material of FIG. 6, taken along the line 6A-6A in FIG. 6.
Figure 6B:
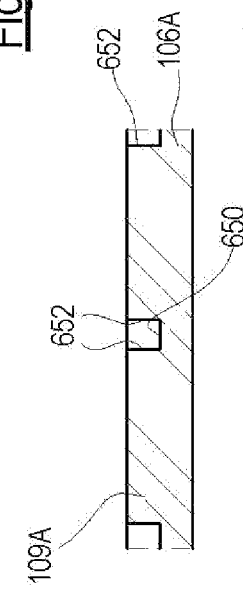
FIG. 6B is an enlargement of a portion of FIG. 6A.
Figure 9:
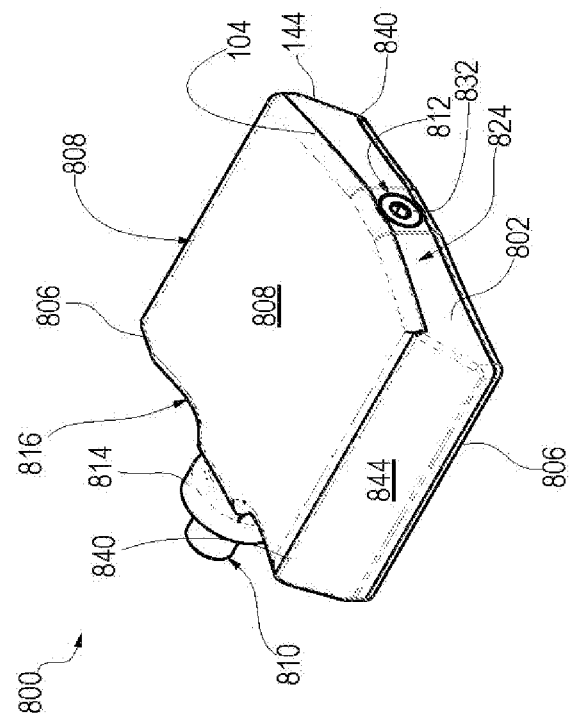
FIG. 9 is an isometric view of the pedal of FIG. 8.
Figure 8:
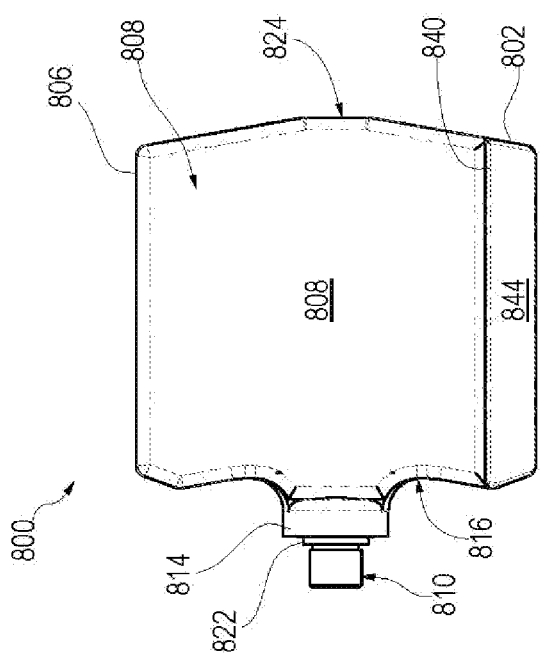
FIG. 8 is a plan view of a second illustrative pedal according to an aspect of the present disclosure.
Figure 12:
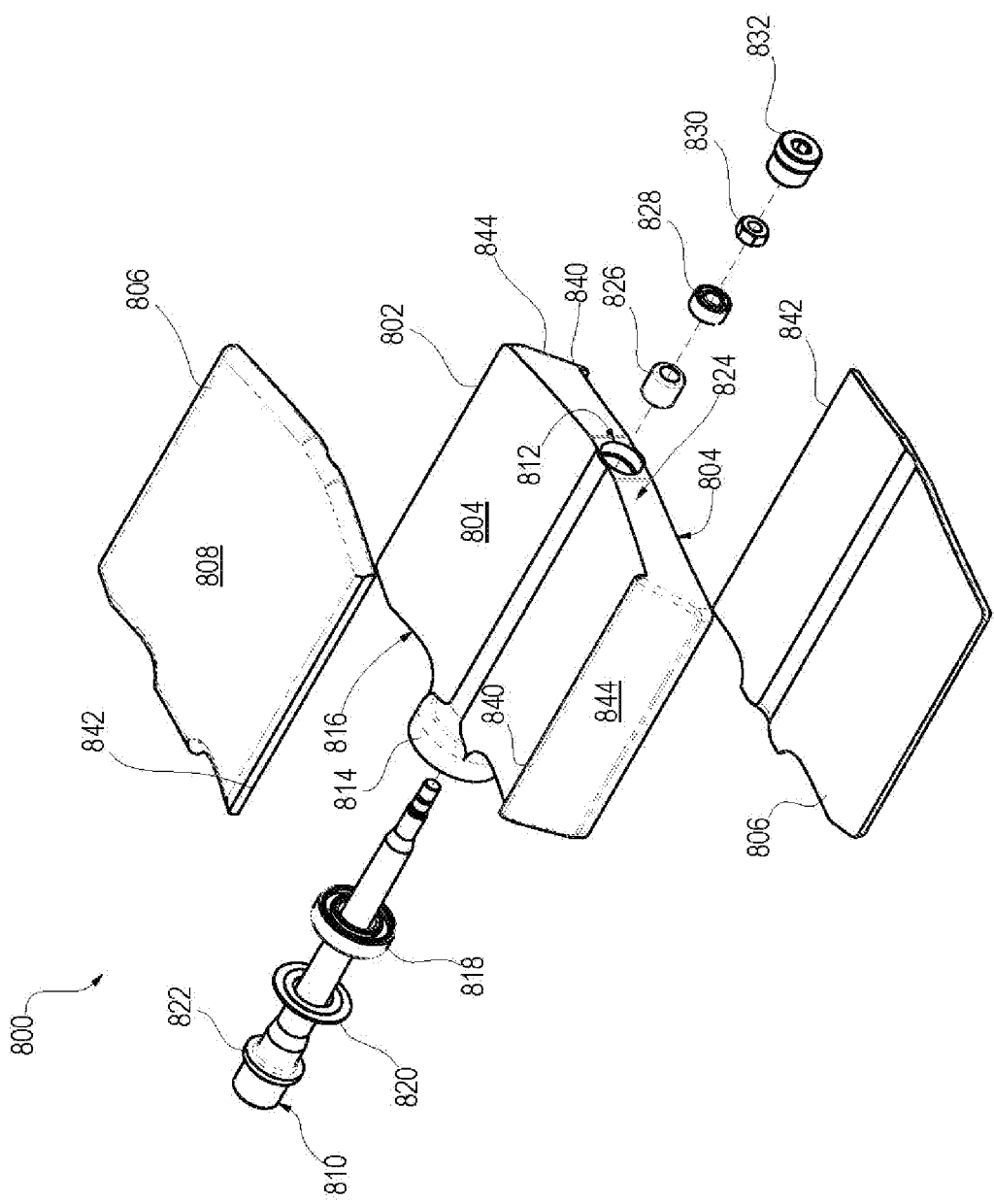
FIG. 12 is an exploded isometric view of the pedal of FIG. 8.
Figure 18:
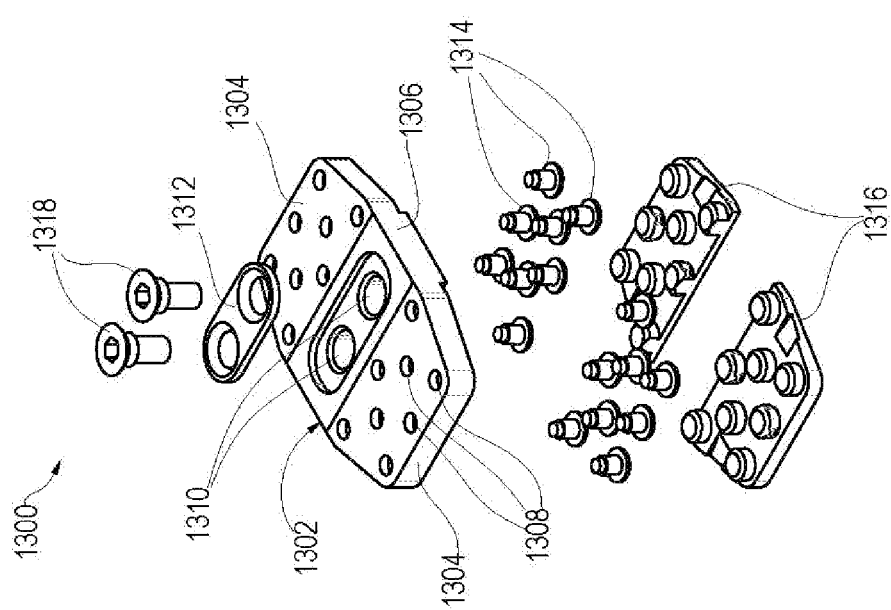
FIG. 18 is an exploded isometric view of the footwear-mountable studded sole plate of FIG. 13.

A first particular embodiment of the layer 106 is shown in FIGS. 6, 6A and 6B and denoted by reference 106A and, when installed on the pedal platform base 104, will form a pedal platform surface, denoted by reference 108A, having a plurality of spaced apart protrusions 109A surrounded by a raised border 111A. In this embodiment, the protrusions 109A are generally cylindrical and project from a generally planar floor 650 of the layer 106A of low-rebound elastomeric material, with the sides 652 of the generally cylindrical protrusions 109A being generally orthogonal to the floor 650.

Figure 7A:
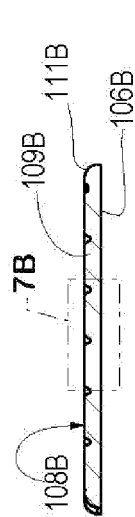
FIG. 7A is a cross-sectional view of the layer of elastomeric material of FIG. 7, taken along the line 7A-7A in FIG. 7.
Figure 7B:
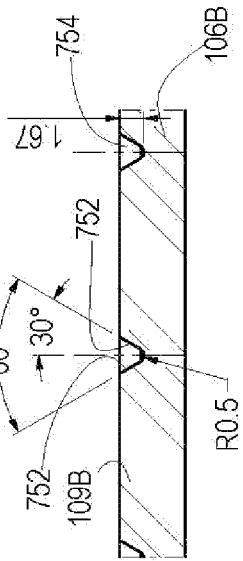
FIG. 7B is an enlargement of a portion of FIG. 7A.

A second particular embodiment of the layer 106 is shown in FIGS. 7, 7A and 7B and denoted by reference 106B and, when installed on the pedal platform base 104, will form a pedal platform surface, denoted by reference 108B, having a plurality of spaced apart protrusions 109B surrounded by a raised border 111B. In this embodiment, the protrusions 109B are generally frustoconical, and have sloped sides 752 that cooperate to form valley-shaped gaps 754 between adjacent protrusions 109B. Although the illustrated protrusions 109B are frustoconical and have sides of constant slope so as to form generally V-shaped gaps 754, other configurations are also contemplated. For example, valley shaped gaps between adjacent protrusions may be, without limitation, generally U-shaped or half-round (i.e. semi-circular in cross section).

In general, the void ratio (ratio of the gap area to the surface area of the protrusions) should be low.

An embodiment in which the pedal platform surface comprises a plurality of spaced-apart protrusions is merely one possible configuration. It is also contemplated that in other embodiments, each pedal platform surface may be substantially smooth and free of protrusions. FIGS. 8 to 12 show an alternate embodiment of a pedal 800 which is substantially identical to the pedal 100 shown in FIGS. 1 to 5, with like reference numerals denoting like features except with the prefix "8" instead of "1". The pedal 800 shown in FIGS. 8 to 12 differs from the pedal 100 shown in FIGS. 1 to 5 in that the pedal platform surfaces 808 are substantially smooth and free of protrusions, with no raised peripheral wall.

In one embodiment of the pedal 800 shown in FIGS. 8 to 12, the low-rebound elastomeric material for the layers 806 of low-rebound elastomeric material in the illustrative pedal 800 may be the RS—Soft Compound offered by UnParallel Sports. The RS—Soft Compound has a Shore A hardness of 65-70 and a resilience of 11%. In some embodiments, the low-rebound elastomeric material for the layers 806 may have a hardness between 40 Shore A and 90 Shore A; this is merely a non-limiting example. In one embodiment, the layers 806 of low-rebound elastomeric material may have a thickness of 3.5 mm; again this is merely an examples and is not intended to be limiting; the layers 806 may have any practical thickness.

The pedal 100 shown in FIGS. 1 to 5 may be well-suited for winter bicycling, as the protrusions 109, 109A, 109B and gaps therebetween assist in clearing snow from the sole of a rider's footwear. In contrast, the pedal 800 shown in FIGS. 8 to 12 may be better suited for summer bicycling. In one embodiment, a pedal may be provided in which one of the opposed pedal platform surfaces has protrusions and the other of the opposed pedal platform surfaces is substantially smooth and free of protrusions, so that one side of the pedal may be used for winter riding and the other side may be used for summer riding.

The use of a low-rebound elastomeric material allows the pedal platform surfaces 108 to effectively engage with studs on a rider's footwear. In particular, because of the relatively low resiliency of the low-rebound elastomeric material, when the studs form complementary indentations in the portions of the pedal platform surfaces 108 that receive the studs, the low-rebound elastomeric material will retain those indentations, facilitating interengagement between the rider's footwear and the pedal platform surfaces 108.

A pair of pedals as described herein, for example the pedal 100 shown in FIGS. 1 to 5 or the pedal 800 shown in FIGS. 8 to 12, may be incorporated into a system that also includes two pieces of footwear, with each piece of footwear having an outer sole and having a plurality of studs projecting from the sole. It is noted here that the term "stud" refers to a hardened protuberance, which, like those on a "studded" tire, extend beyond any tread pattern on the sole. Thus, the term "stud" expressly excludes the raised portions of a tread pattern on the sole of a piece of footwear. In one currently preferred embodiment, the studs may be carbide-tipped studs, although other suitable materials, including metals and polymers of sufficient hardness, may also be used. Preferably, the stud tips have a hardness of at least about 40 Rockwell B, more preferably at least about 60 Rockwell B (e.g. 6061-T6 aluminum) and still more preferably at least about 40 Rockwell C, for example, hardened steels or carbide tips.

The studs may project from the sole of the footwear through a variety of arrangements. In one embodiment, footwear may be manufactured with the studs embedded in the soles, e.g. studded-sole footwear, or footwear with inbuilt cleats. In another embodiment, separate threaded sole studs may be screwed into the sole of the footwear (one example is the Grip Studs® footwear studs offered by Deardorff Fitzsimmons Corporation, having an address at P.O. Box 539, Merlin, Oregon 97532 and available for order at the website https://www.gripstuds.com/running.php). In yet another embodiment, footwear-mountable studded sole plates may be provided for mounting on the sole of the footwear.

Figure 21:
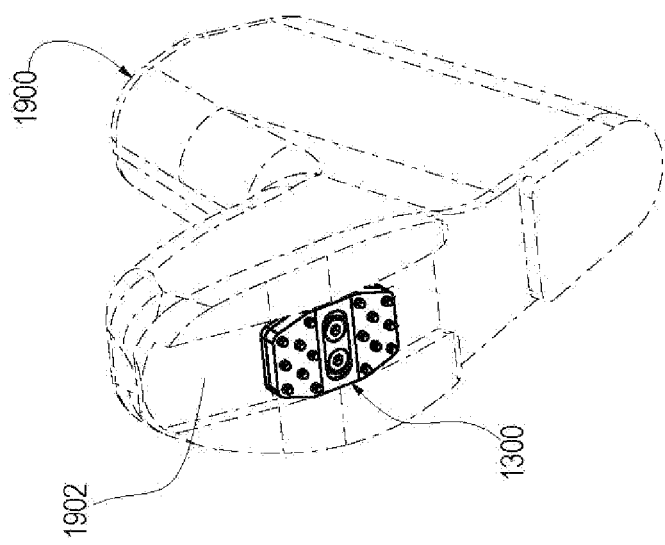
FIG. 21 is a second bottom isometric view of the piece of footwear of FIG. 19.
Figure 20:
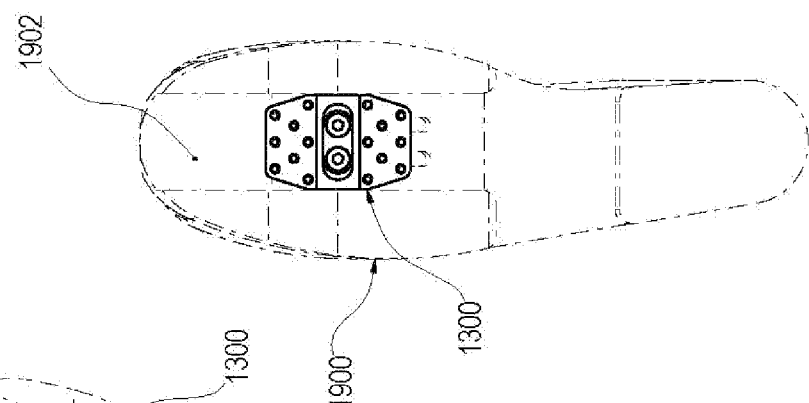
FIG. 20 is a bottom plan view of the piece of footwear of FIG. 19.
Figure 19:
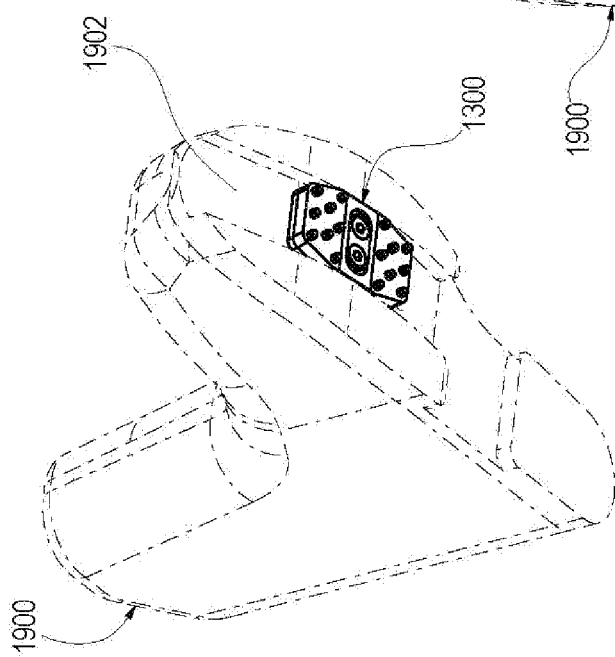
FIG. 19 is a first bottom isometric view of a piece of footwear having the footwear-mountable studded sole plate of FIG. 13 mounted on a sole thereof.
Figure 23:
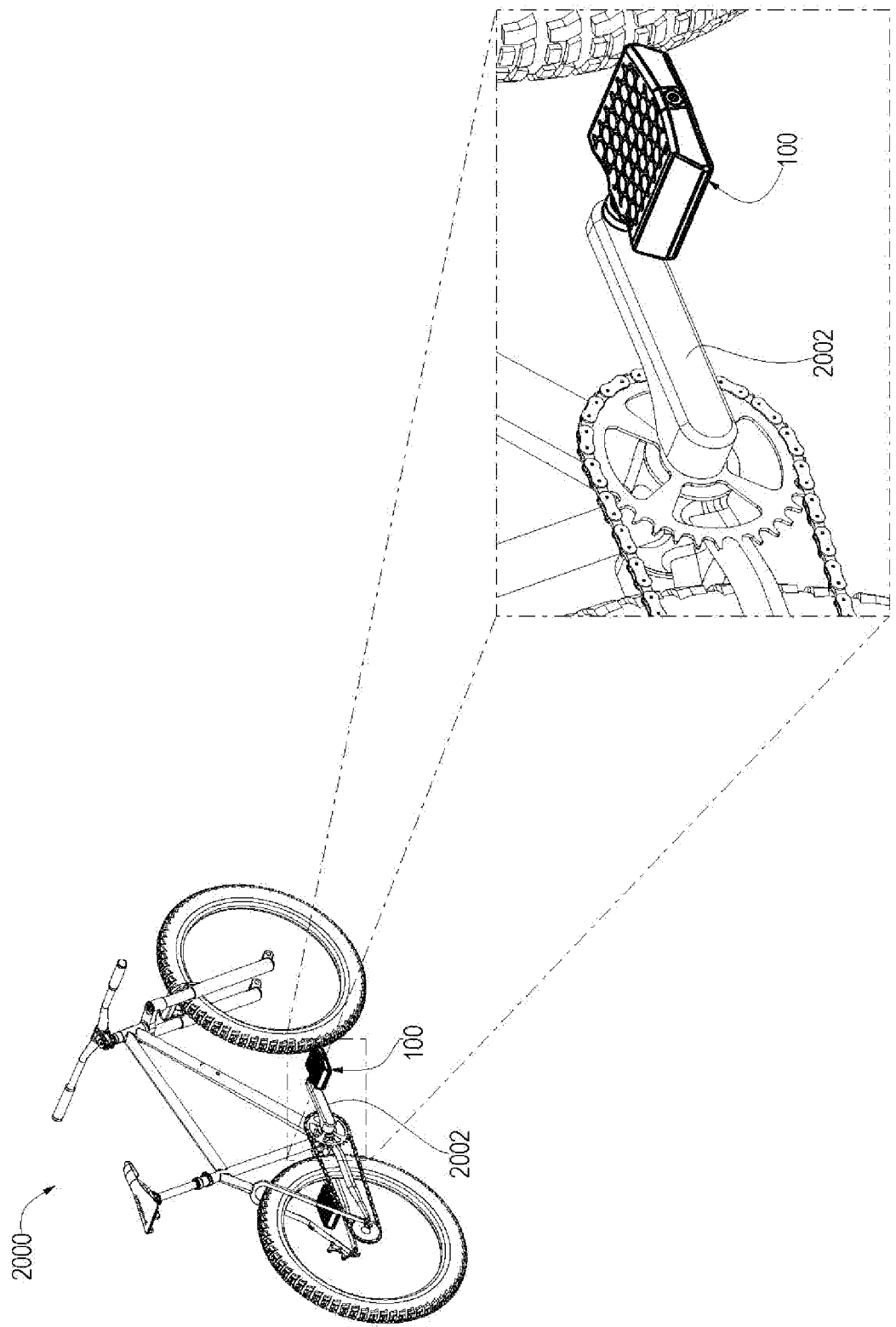
FIG. 23 is a rear isometric view of the bicycle of FIG. 22 with an enlarged portion showing detail of one of the pedals of FIG. 1 mounted thereon.
Figure 24:
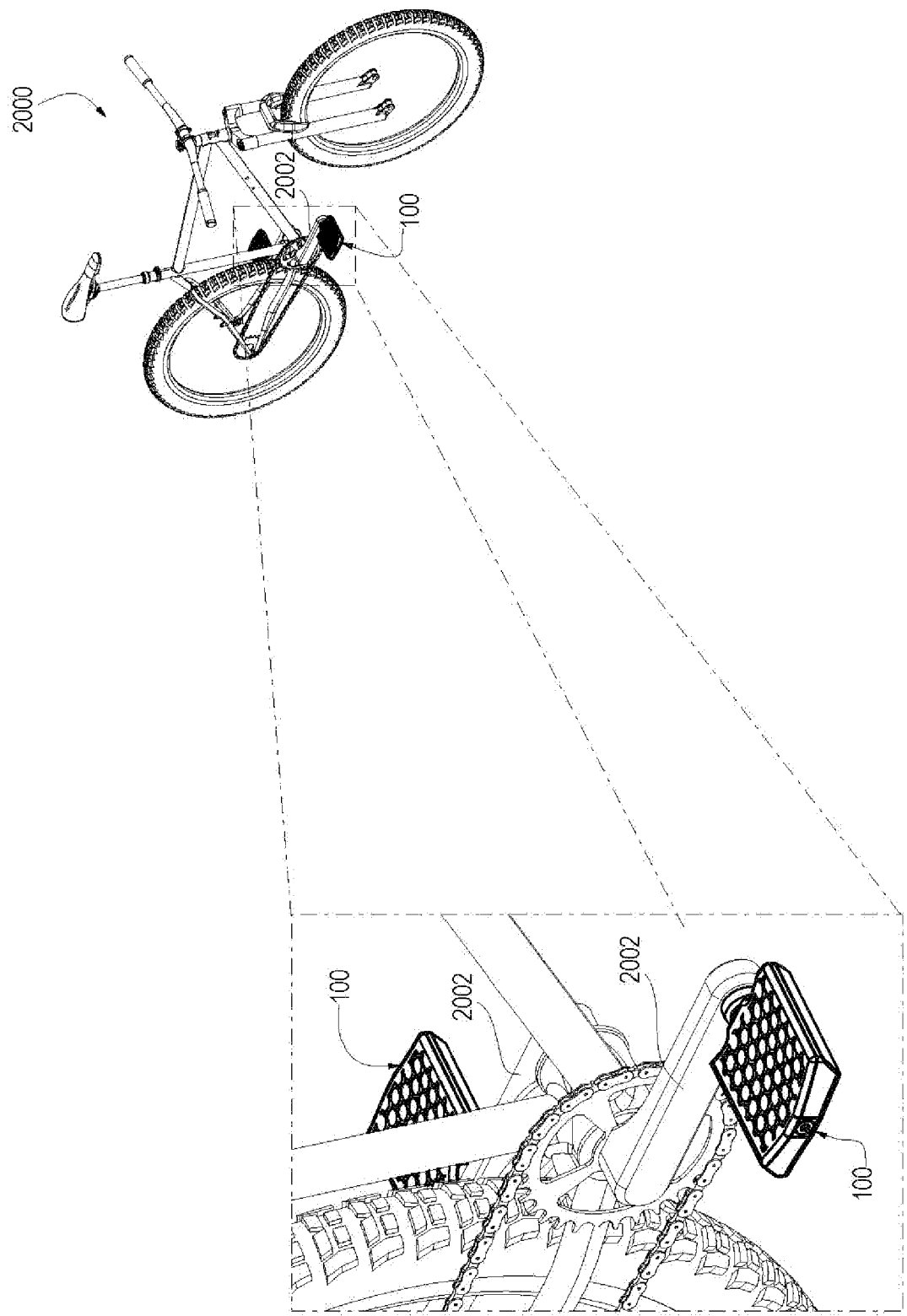
FIG. 24 is a front isometric view of the bicycle of FIG. 22 with an enlarged portion showing detail of one of the pedals of FIG. 1 mounted thereon.
Figure 25:
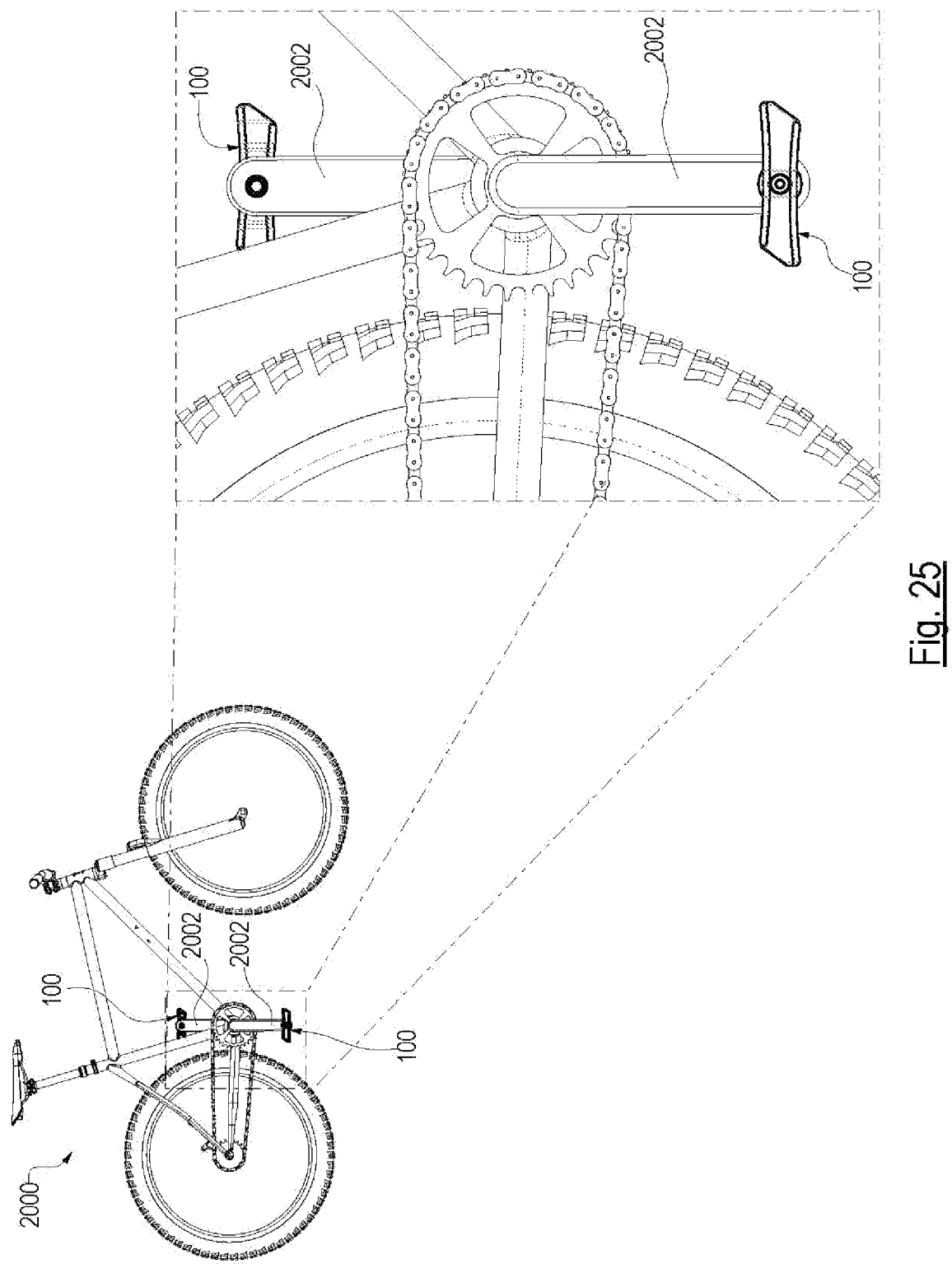
FIG. 25 is a side elevation view of the bicycle of FIG. 22 with an enlarged portion showing detail of the pedals mounted thereon.

Reference is now made to FIGS. 13 through 18, which show a non-limiting illustrative embodiment of a footwear-mountable studded sole plate, indicated generally by reference 1300. The illustrated studded sole plate 1300 comprises a baseplate 1302 having two generally trapezoidal stud-carrying portions 1304 separated by a generally rectangular mounting portion 1306. The baseplate 1302 is preferably of monolithic construction. Stud apertures 1308 (see FIG. 18) are formed through the stud-carrying portions 1304, and two mounting apertures 1310 (see FIG. 18) are formed through the mounting portion 1306, which is recessed to accommodate an obround washer plate 1312. Alternatively, the washer plate may be omitted, and countersunk holes may be provided directly in the mounting portion of the baseplate. Flanged studs 1314 pass through the stud apertures 1308, and are supported by backer plates 1316. Two flat head screws 1318 pass through the washer plate 1312 and the mounting apertures 1310 to enable the studded sole plate 1300 to be screwed into the sole of a piece of footwear, such as a shoe or a boot, among other types of footwear. FIGS. 19 to 21 show a boot 1900, as an illustrative piece of footwear, with the studded sole plate 1300 of FIGS. 13 through 18A installed on a sole 1902 of the boot 1900. The shape of the illustrated studded sole plate 1300 is merely a non-limiting illustrative example, and studded sole plates according to the present disclosure may have a wide range of shapes. For example, the stud-carrying portions may alternatively be square, rectangular, circular, oval, or may have irregular shapes.

Thus, in some embodiments a mountain biking kit may be provided, which may include two pedals of the type described herein together with at least one of a pair of studded-sole footwear (footwear manufactured with inbuilt studs or cleats), a pair of footwear-mountable studded sole plates (including a kit for assembling such sole plates), and a plurality of threaded sole studs (which may be screwed into the sole of footwear already owned by a recipient of the mountain biking kit).

FIGS. 22 to 25 show a bicycle 2000 with pedals 100 of the type shown in FIGS. 1 to 5 installed on the crank arms 2002 thereof; pedals 800 of the type shown in FIGS. 8 to 12, or any other pedal within the scope of the present disclosure, may be similarly mounted. Thus, a bicycle having pedals as described herein is also contemplated within the scope of the present disclosure. Certain well-known features of the bicycle 2000 are omitted from FIGS. 22 to 25 for simplicity of illustration; construction of bicycles generally is within the capability of those of ordinary skill in the art.

Certain illustrative embodiments have been described by way of example. It will be apparent to persons skilled in the art that a number of variations and modifications can be made without departing from the scope of the claims.

What is claimed is:

1. A bicycle pedal, comprising:
   a main pedal body adapted to rotatably receive an axle;
   the main pedal body defining two opposed pedal platform bases;
   wherein a single respective layer of a low-rebound elastomeric material is disposed on each of the opposed pedal platform bases to form only one single continuous pedal platform surface for each one of the opposed pedal platform bases;
   wherein each pedal platform surface is concave along a travel axis of the pedal;
   wherein for each one of the opposed pedal platform bases, the main pedal body defines a delamination shield that extends beyond the respective pedal platform base to shield a junction between a vanguard inferior edge of the respective layer of low-rebound elastomeric material and the respective pedal platform base;
   each delamination shield is formed monolithically as part of the main pedal body and comprises a solid unperforated wall of material that covers all of the respective junction between the vanguard inferior edge and the pedal platform base; and
   a vanguard edge of each delamination shield is sloped or chamfered obliquely relative to the travel axis of the pedal.

2. The pedal of claim 1, wherein each pedal platform surface comprises a plurality of spaced-apart protrusions.

3. The pedal of claim 2, wherein sides of the protrusions are generally orthogonal to a floor of the layer of the low-rebound elastomeric material.

4. The pedal of claim 2, wherein the protrusions have sloped sides to form gaps between adjacent ones of the protrusions.

5. The pedal of claim 4, wherein the gaps are one of U-shaped, V-shaped and half-round.

6. The pedal of claim 1, wherein each pedal platform surface is substantially smooth and free of protrusions.

7. A system, comprising:
two pedals, each according to claim 1; and
two pieces of footwear, each piece of footwear having an outer sole and having a plurality of studs projecting from the sole.

8. The system of claim 7, wherein tips of the studs have a hardness of at least 40 Rockwell B.

9. The system of claim 8, wherein the tips of the studs have a hardness of at least 40 Rockwell C.

10. A mountain biking kit, comprising:
at least one pedal, each according to claim 1; and
at least one of:
  at least one studded-sole footwear;
  at least one footwear-mountable studded sole plate; or
  a plurality of threaded sole studs.

11. The mountain biking kit of claim 10, comprising:
two pedals, each according to claim 1; and
at least one of:
  a pair of studded-sole footwear;
  a pair of footwear-mountable studded sole plates; or
  a plurality of threaded sole studs.

* * * * *